(12) United States Patent
Gmitro et al.

(10) Patent No.: US 8,773,760 B2
(45) Date of Patent: Jul. 8, 2014

(54) MULTI-POINT SCAN ARCHITECTURE

(75) Inventors: Arthur F. Gmitro, Tucson, AZ (US);
Andrew R. Rouse, Tucson, AZ (US);
Anthony A. Tanbakuchi, Albuquerque, NM (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 298 days.

(21) Appl. No.: 13/266,165

(22) PCT Filed: Apr. 23, 2010

(86) PCT No.: PCT/US2010/032197
§ 371 (c)(1),
(2), (4) Date: Jan. 13, 2012

(87) PCT Pub. No.: WO2010/126790
PCT Pub. Date: Apr. 11, 2010

(65) Prior Publication Data
US 2012/0113506 A1    May 10, 2012

Related U.S. Application Data

(60) Provisional application No. 61/214,703, filed on Apr. 27, 2009.

(51) Int. Cl.
*G02B 21/06* (2006.01)
(52) U.S. Cl.
USPC .......................................... 359/385; 359/388
(58) Field of Classification Search
USPC .................................. 359/385, 388
See application file for complete search history.

(56) References Cited

U.S. PATENT DOCUMENTS

| | | | |
|---|---|---|---|
| 5,459,570 A | 10/1995 | Swanson et al. | |
| 5,841,139 A | 11/1998 | Sostek et al. | |
| 6,028,306 A | 2/2000 | Hayashi | |
| 6,248,988 B1 * | 6/2001 | Krantz | 250/201.3 |
| 6,285,020 B1 * | 9/2001 | Kim et al. | 250/216 |
| 6,445,453 B1 * | 9/2002 | Hill | 356/450 |
| 6,485,413 B1 | 11/2002 | Boppart et al. | |

(Continued)

FOREIGN PATENT DOCUMENTS

| | | |
|---|---|---|
| EP | 1431795 | 6/2004 |
| WO | WO 2005/033767 | 4/2005 |
| WO | WO 2010/126790 | 4/2010 |

OTHER PUBLICATIONS

Rouse, A. R., et al., "Design and demonstration of a miniature catheter for a confocal microendoscope," Applied Optics, vol. 43 No. 31, pp. 5763-5771, Nov. 1, 2004.*

(Continued)

*Primary Examiner* — Frank Font
(74) *Attorney, Agent, or Firm* — Davis Wright Tremaine LLP

(57) ABSTRACT

The embodiments of this invention use a multi-point scanning geometry. This design maintains the high frame rate of the slit-scan system and still allows both grayscale and multi-spectral imaging. In a confocal configuration, the multi-point scanning system's confocal performance is close to that of a single point scan system and is expected to yield improved depth imaging when compared to a slit-scan system, faster imaging than a point scan system, and the capability for multi-spectral imaging not readily achievable in a Nipkow disk based confocal system.

20 Claims, 6 Drawing Sheets

(56) References Cited

U.S. PATENT DOCUMENTS

| | | | |
|---|---|---|---|
| 7,339,148 B2* | 3/2008 | Kawano et al. | 250/201.3 |
| 7,532,320 B2 | 5/2009 | Neiss et al. | |
| 7,649,629 B2 | 1/2010 | Rogers et al. | |
| 2002/0148955 A1* | 10/2002 | Hill | 250/234 |
| 2005/0111082 A1 | 5/2005 | Karin | |
| 2007/0238955 A1 | 10/2007 | Tearney et al. | |
| 2007/0280612 A1 | 12/2007 | Treado et al. | |
| 2011/0002024 A1* | 1/2011 | Sheblee et al. | 359/201.2 |
| 2011/0040169 A1 | 2/2011 | Kamen et al. | |

OTHER PUBLICATIONS

Viellerobe, B. et al., "Manua Kea technologies' F400 protoype: a new tool for in vivo microscopic imaging during endoscopy," Proceedings of SPIE 6082 60820C, 2006; Downloaded from http://proceedings.spiedigitallibrary.org/ on Sep. 9, 2013.*

U.S. Appl. No. 61/343,119, filed Apr. 23, 2010, 22 pages.

U.S. Appl. No. 61/214,703, filed Apr. 27, 2009, 56 pages.

National Cancer Institute, "Surveillance Epidemiology and End Results Stat Fact Sheets: Ovary" (2010), http://seer.cancer.gov/statfacts/html/ovary.html#survival, 4 pages.

Tanbakuchi et al., "Clinical confocal microlaparoscope for real-time in vivo optical biopsies," J. Biomed. Opt. 14(4), 044030 (2009).

Thong et al., "Laser confocal endomicroscopy as a novel technique for fluorescence diagnostic imaging of the oral cavity," J. Biomed. Opt. 12(1), 014007 (2007).

Kiesslich et al, "Confocal laser endoscopy for diagnosing intraepithelial neoplasias and colorectal cancer in vivo," Gastroenterology 127(3), 706-713 (2004).

Carlson et al., "In vivo fiber-optic confocal reflectance microscope with an injection-molded plastic miniature objective lens," Appl. Opt. 44(10), 1792-1797 (2005).

Gmitro et al., "Confocal microscopy through a fiber-optic imaging bundle," Opt. Lett. 18(8), 565-567 (1993).

Shin et al., "Fiber-optic confocal microscope using a MEMS scanner and miniature objective lens," Opt. Express 15(15), 9113-9122 (2007).

Tearney et al., "Spectrally encoded confocal microscopy," Opt. Lett. 23(15), 1152-1154 (1998).

Izatt et al., "Optical coherence tomography and microscopy in gastrointestinal tissues," IEEE J. Sel. Top. Quantum Electron. 2(4), 1017-1028 (1996).

Wojtkowski et al., "In vivo human retinal imaging by Fourier domain optical coherence tomography," J. Biomed. Opt. 7(3), 457-463 (2002).

Korde, et al., "Using optical coherence tomography to evaluate skin sun damage and precancer," Lasers Surg. Med. 39(9), 687-695 (2007).

Kang, et al., "Combined spectrally encoded confocal microscopy and optical frequency domain imaging system," Proc. SPIE 7172, 717206, 717206-7 (2009).

Vakhtin et al, "Common-path interferometer for frequency-domain optical coherence tomography," Appl. Opt. 42(34), 6953-6958 (2003).

Makhlouf et al., "Dual Modality Fluorescence Confocal and Spectral-Domain Optical Coherence Tomography Microendoscope," *Biomedical Optics Express*, Mar. 1, 2011, vol. 2, No. 3, pp. 635-644.

Makhlouf et al., "Integrated Fluorescence Confocal and Spectral-Domain Optical Coherence Tomography Microendoscope," San Francisco, California, 2011, 6 pages.

U.S. Office Action for U.S. Appl. No. 13/092,738 mailed Mar. 5, 2013, 19 pages.

Xiaolu Li, Signal-to-Noise Ratio Analysis of All-Fiber Common-Path Optical Coherence Tomography, Aug. 19, 2008, vol. 47, pp. 4833-4834, Applied Optics.

* cited by examiner

Pinhole

Slit

Nipkow

Linear Array 1

Linear Array 2

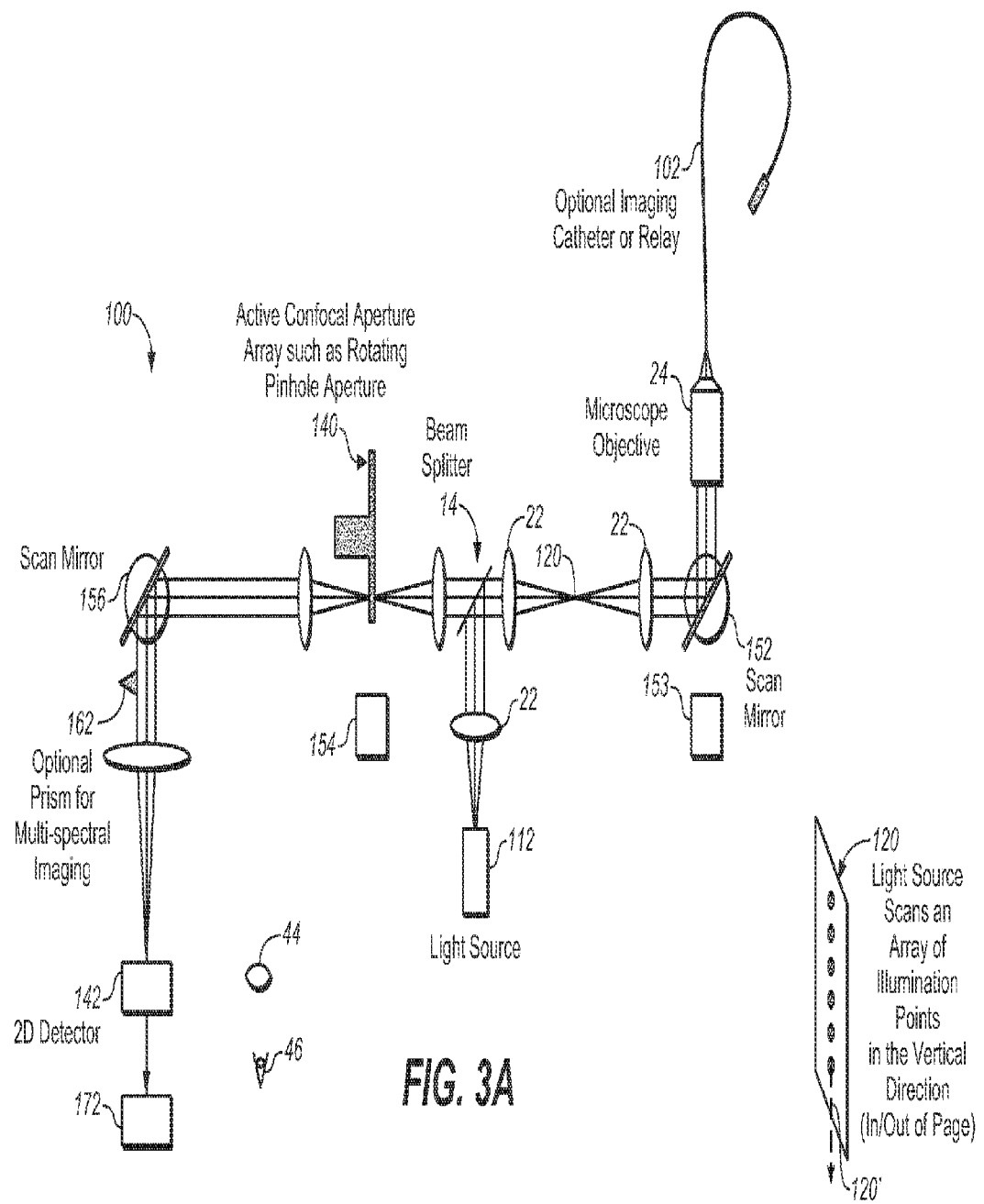

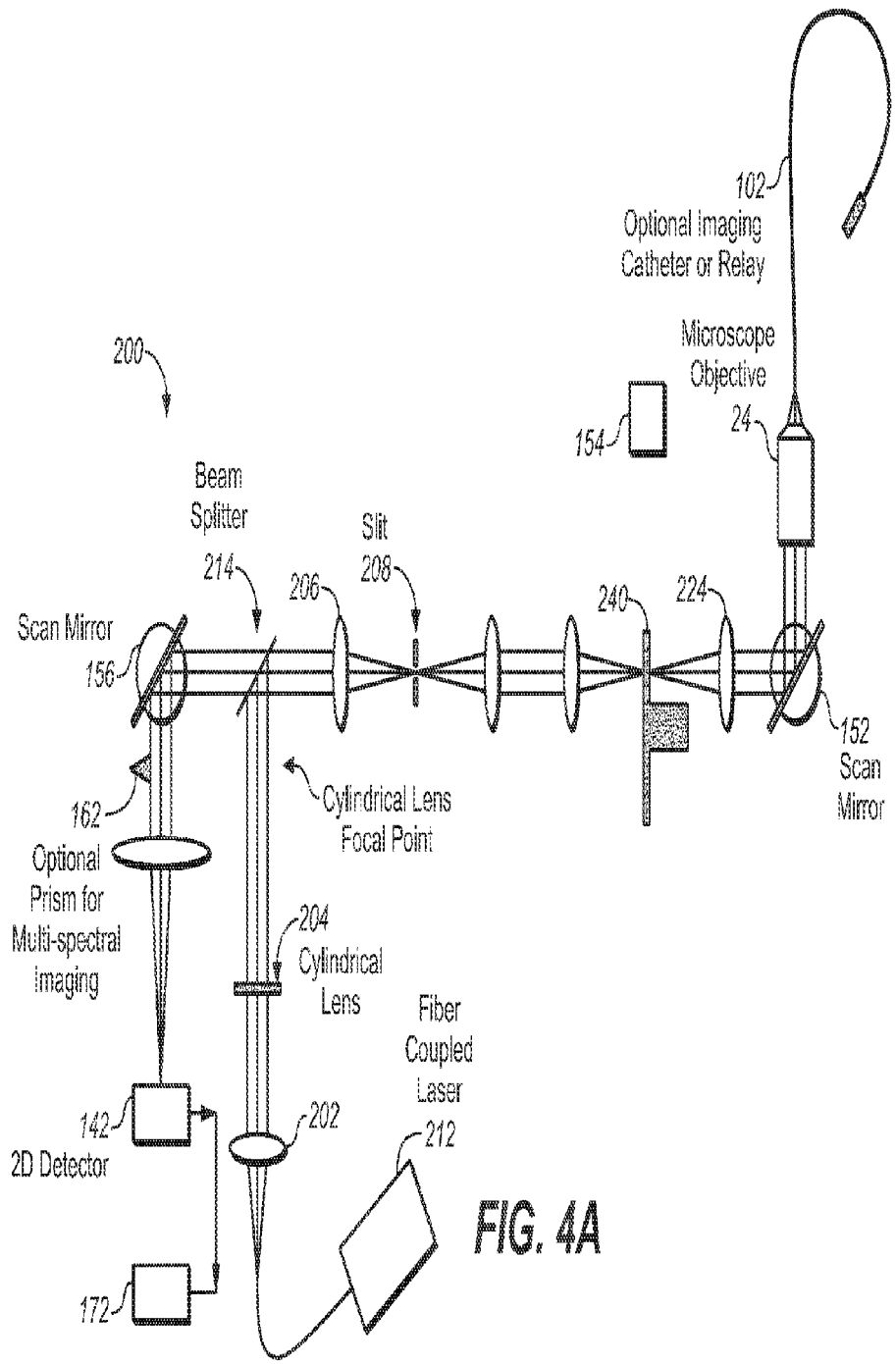
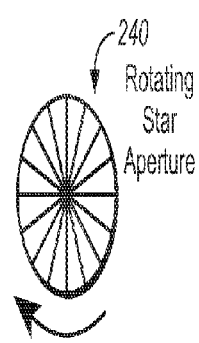
FIG. 4A
FIG. 4B

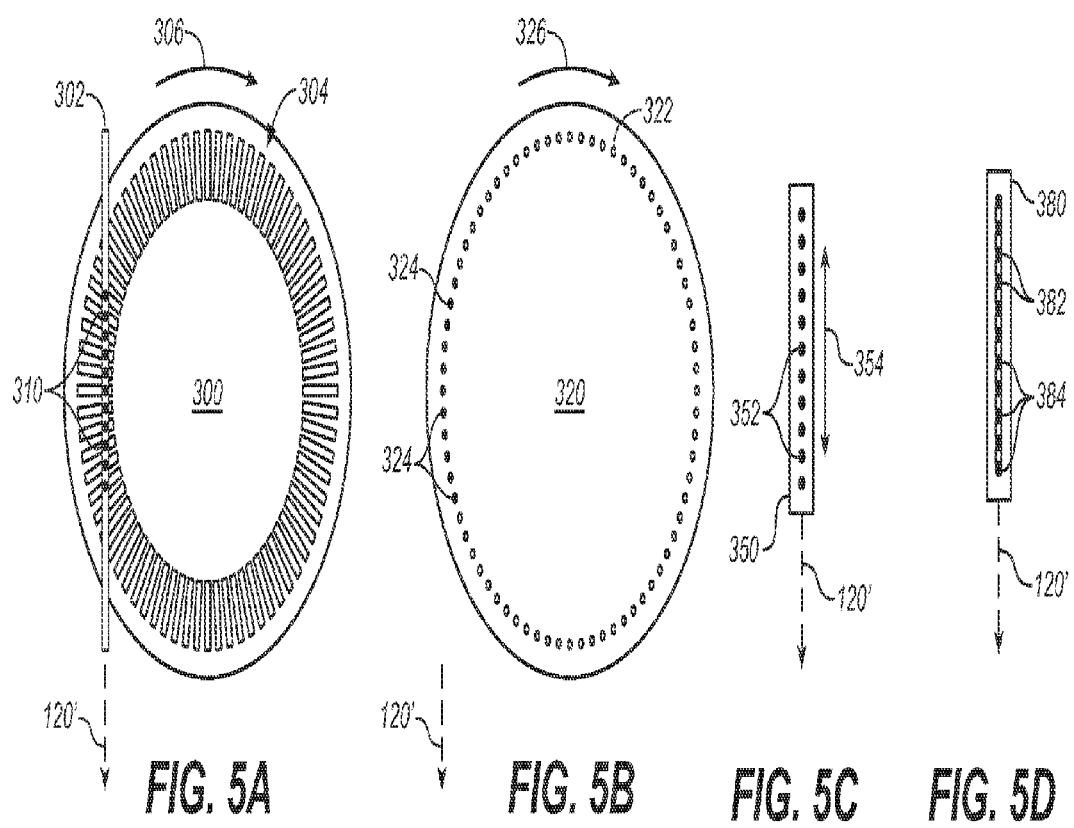

MULTI-POINT SCAN ARCHITECTURE

BACKGROUND

This invention relates in general to an optical scanning instrument, and more particularly to a multi-point scan architecture.

Confocal microendoscopy is an emerging technology that allows in situ confocal microscopic imaging of cells in live animals and humans. A number of approaches to confocal microendoscopy have been developed. The two most common methods are those that employ a coherent fiber optic bundle to relay the image plane of confocal microscope into the body, and those that build a miniaturized confocal microscope with the scanning mechanism into the distal tip of the flexible imaging device.

For the miniaturized confocal microscope method, see Dickensheets, D. L., et al., "Micromachined scanning confocal optical microscope," *Optics Letters* 21, 764-766 (1996), Kiesslich R, et al., "Confocal laser endoscopy for diagnosing intraepithelial neoplasias and colorectal cancer in vivo," *Gastroenterology* 127, 706-713 (2004). For the coherent fiber optic bundle, see Gmitro A. F., et al., "Confocal Microscopy Through a Fiber-Optic Imaging Bundle," *Optics Letters* 18,565-567 (1993), Viellerobe, B., et al., "Mauna Kea technologies' F400 prototype: a new tool for in vivo microscopic imaging during endoscopy," *Proceedings of SP*1E. 6082 60820C (2006).

For the development of a confocal microendoscope utilizing a slit-scan fluorescence confocal microscope coupled to a fiber bundle with a custom miniature objective lens, see Rouse A. R., et al., "Design and demonstration of a miniature catheter for a confocal microendoscope," *Applied Optics* 43, 5763-5771 (2004). This system operates at 30 frames per second and provides high quality fluorescent microscopic images of living tissue. This system has also been configured to allow multi-spectral imaging with essentially instantaneous switching between grayscale and multi-spectral modes of operation, see Rouse A. R., et al., "Design and demonstration of a miniature catheter for a confocal microendoscope," *Applied Optics* 43, 5763-5771 (2004).

In the context of confocal microendoscopy, multi-spectral imaging provides a powerful capability allowing identification of multiple fluorophores and/or the sensing of subtle spectral shifts caused by tissue microenvironment.

A slit-scan confocal microscope represents a compromise between speed of operation and confocal imaging performance. Theory predicts that lateral resolution is maintained but axial resolution is reduced for a slit scan versus a point scan system. These theoretical results are for a non-scattering medium. Recent Monte Carlo simulation results show that performance degrades with depth for both point-scan and slit-scan systems, but that in the slit-scanning geometry the effects are severe enough to limit the practical imaging depth for in vivo imaging applications.

It is therefore desirable to provide an improved scan architecture in which the above disadvantages are not present.

SUMMARY

In one embodiment, a method for scanning an object comprises providing a substantially one dimensional array of two or more illumination beams spread along a first dimension travelling in a forward direction. The array of two or more illumination beams are focused to an object plane in the object. Light from said first illumination beam is scanned along a second dimension transverse to the first dimension before such light reaches the object plane. The instrument providing the array of illumination beams or scanning along a second dimension also causes such light to scan along the first dimension, so that said array of two or more illumination beams scans across the object plane along said first and second dimensions. Light caused by interaction of the array of two or more illumination beams and the object is transmitted through a confocal aperture array in the reverse direction in a manner so that the transmitted light caused by the interaction matches a profile of the said array of two or more illumination beams.

Another embodiment is directed to a confocal microscope comprising a light source providing a first illumination beam travelling in a forward direction, and a device that modulates the first illumination beam to provide a substantially one dimensional array of two or more illumination beams spread along a first dimension. Optics are employed that focus the array of two or more illumination beams to an object plane. A first mechanism is used to scan light from the first illumination beam along a second dimension transverse to the first dimension before such light reaches the object plane. The first mechanism or the device causes such light to scan along the first dimension, so that the array of two or more illumination beams scans across the object plane along said first and second dimensions. A confocal aperture array transmits light caused by interaction of the array of two or more illumination beams and the object in the reverse direction in a manner so that the transmitted light caused by the interaction matches a profile of the said array of two or more illumination beams.

In yet another embodiment, a confocal microscope comprises a light source providing a first illumination beam travelling in a forward direction to an object, and a confocal aperture array. The confocal aperture array passes portions of the first illumination beam to form a substantially one dimensional array of two or more illumination beams spread along a first dimension travelling in the forward direction and transmitting light caused by interaction of the array of two or more illumination beams and the object in the reverse direction. The confocal aperture array is made to move so that different portions of the first illumination beam are passed at different times to form the array of two or more illumination beams in the forward direction, thereby causing the array of two or more illumination beams to scan the object along the first dimension. The microscope includes optics that focus the array of two or more illumination beams to an object plane and a mechanism to scan array of two or more illumination beams along a second dimension transverse to the first dimension, so that said array of two or more illumination beams scans across the object plane along said first and second dimensions.

The above embodiments use a multi-point scanning geometry. This design maintains the high frame rate of the slit-scan system and still allows rapid switching between grayscale and multi-spectral imaging. In a confocal configuration, the multi-point scanning system's confocal performance is close to that of a single point scan system and is expected to yield improved depth imaging when compared to a slit-scan system.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 3A is a schematic view of a multi-point scanning system employing a moving confocal aperture array to illustrate a second embodiment of the invention.

FIG. 3B is a schematic view of the illumination points or beams in FIG. 3A.

FIG. 4A is a schematic view of a multi-point scanning system employing a moving confocal aperture array that causes multi-point illumination and scanning to illustrate a third embodiment of the invention.

FIG. 4B is a schematic view of the rotating star aperture array in FIG. 4A.

FIGS. 5A, 5B, 5C and 5D are schematic views of four different arrangements for creating multi-point illumination.

For simplicity in description, identical components are labeled by the same numerals in this Application.

DETAILED DESCRIPTION

Figure 1A:
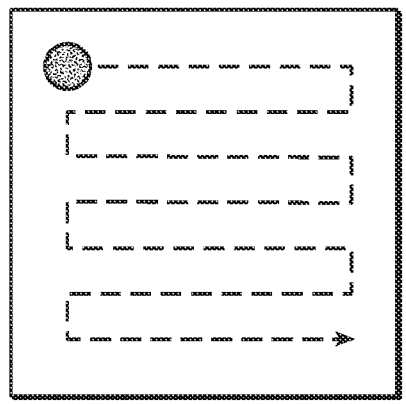
FIGS. 1A, 1B, and 1C are schematic views of the scan paths of respectively a single point scan system, a slit-scan system and a Nipkow disk scan system.
Figure 1B:
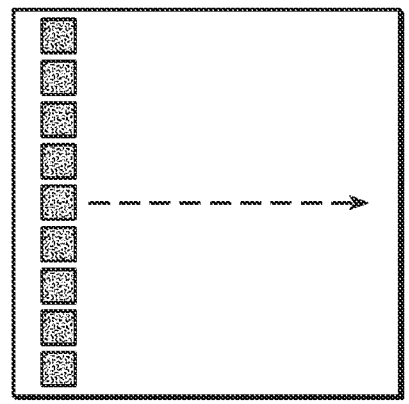
Figure 1C:
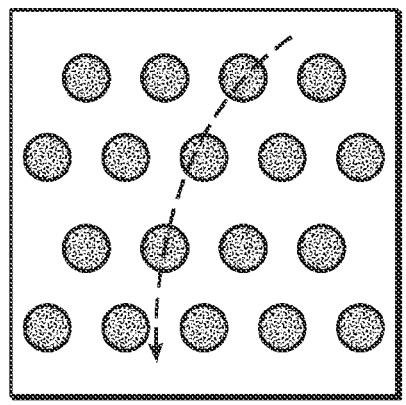
Figure 1D:
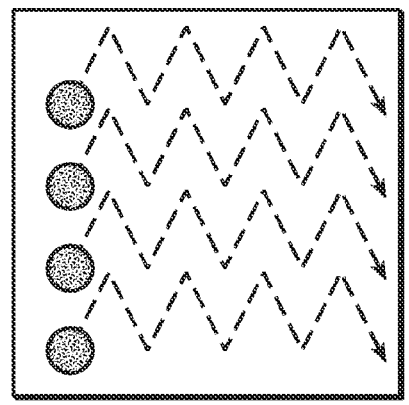
FIGS. 1D and 1E are schematic views of scan paths to illustrate the operation of different embodiments of this invention.
Figure 1E:
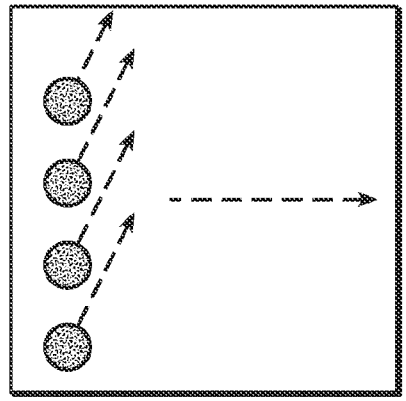

FIGS. 1A, 1B and 1C are schematic views of the scan paths (shown in broken lines) of respectively a single point scan system, a slit-scan system and a Nipkow disk scan system. FIG. 1D is a schematic view of the scan path (shown in broken lines) of a linear array of pinholes scan system. FIG. 1E is a schematic view of the scan paths (shown in broken lines) useful to illustrate some of the embodiments of this invention. All of the scan paths in the five figures cover the plane or surface scanned.

As will be explained below, one advantage of the multi-point array scan architectures in FIGS. 1D and 1E over that of the Nipkow disk is that it enables multi-spectral imaging to be performed. The multi-point array scan architecture in FIGS. 1D and 1E yields improved depth imaging when compared to a slit-scan system. When used in a confocal microscope, the performance of this multi-point array is close to that of a single point scan system.

Figures 2A, 2B:
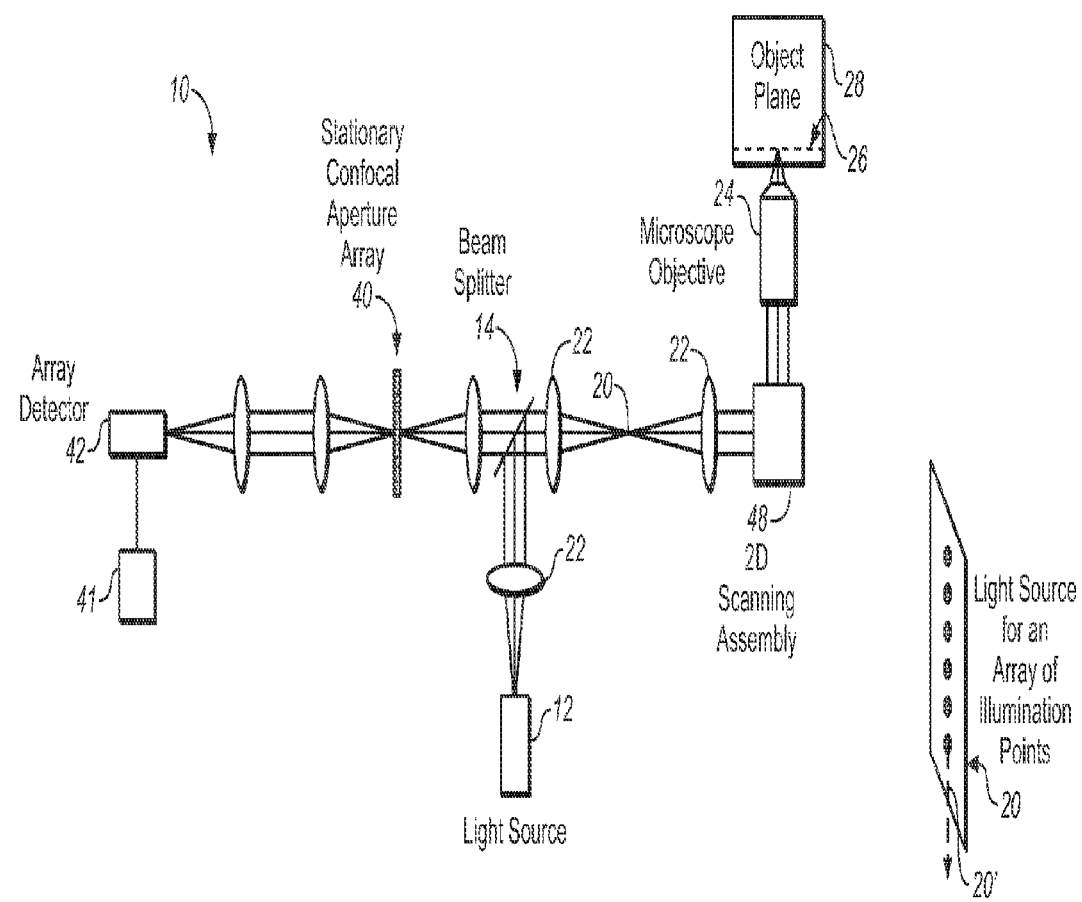
FIG. 2A is a schematic view of a multi-point scanning system employing a stationary confocal aperture array to illustrate a first embodiment of the invention.
FIG. 2B is a schematic view of the illumination points or beams in FIG. 2A.

FIG. 2A is a schematic view of a multi-point scanning system employing a stationary confocal aperture array to illustrate a first embodiment of the invention. The system 10 utilizes a light source 12 and a beamsplitter 14, to couple excitation light into the system. The light source 12 provides a substantially one dimensional array 20 of two or more illumination beams spread along a first dimension. In this application, the phrase "along a first dimension" means along a first line or direction, and the phrase "along a second dimension" means along a second line or direction. The array 20 of illumination beams is shown schematically in FIG. 2B as an array of illumination points, where the first dimension is along line or direction 20'. The light source 12 may include a laser or lamp (not shown), a cylindrical lens (not shown), and a grating or pinhole aperture array (not shown) for generating a substantially one dimensional array 20 of two or more illumination beams spread along a first dimension 20'.

The lenses 22 and the microscope objective 24 combine to image the light source to the object plane 26 of the confocal microscope 10. The array 20 of multiple points of light is imaged onto the object plane 26 in object 28, where the light interacts with an object 28. As illustrate in FIG. 2A, the object plane 26 is inside the object 28; however, this need not be the case, and the object plane 26 can be located at the surface of the object 28. Light caused by the interaction of the multiple points of light with the object returns through the system and is re-imaged onto the confocal aperture plane of a stationary confocal aperture array 40. The returning light through the aperture array 40 is then imaged onto a detector array 42. The interaction of the multiple points of light with the object may cause fluorescent light to return from the object 28, or the returning light from the object can be reflection or scattering of array 20 of illumination beams. Where the interaction of the multiple points of light with the object causes fluorescent light to return from the object 28, beamsplitter 14 is dichroic and passes only the fluorescence from the object and eliminates excitation light reflected from the object or scattered within the optical system. Where the interaction of the multiple points of light with the object causes reflection or scattering of array 20 of illumination beams to return from the object 28, beamsplitter 14 is not dichroic and separates light directed to the object from light returning from the object.

The array 20 of two or more illumination beams, also referred to herein as array of multiple points of light, has a substantially one dimensional profile, such as the one illustrated in FIG. 2B. The stationary confocal aperture array 40 preferably has a profile that matches that of array 20, to pass the light resulting from interaction of the multiple points of light with the object in a confocal configuration.

The light passing back through the aperture array 40 would represent a line image of the object 28 at a selected depth and at a specific set of spatial positions on the object. To produce a 2D image scanning is performed by means of a 2D scanning mechanism 48 and the signals are digitized and processed by a computer 41 to generate the 2D image.

FIG. 3A is a schematic view of a multi-point scanning system 100 employing a moving confocal aperture array to illustrate a second embodiment of the invention. The system 100 differs from system 10 of FIG. 2A in that the light source 112 generates a substantially one dimensional array 120 of two or more illumination beams spread along a first dimension 120' shown in FIG. 3B, where the array 120 is scanned also substantially along the first dimension 120'. Hence instead of using a 2D scanning assembly as in system 10, a scan mirror 152 scanning in a second direction or dimension transverse to the dimension 120' (such as about an axis that is perpendicular to the page) is adequate to accomplish the 2D image scanning in the manner illustrated in FIG. 1E. The generation of a scanning array of two or more illumination beams spread along a first dimension 120' and also scanning along first dimension 120' is described below in reference to FIGS. 5A-5D.

In FIG. 3A, the light from array 120 is conveyed to the object (not shown) imaged by means of an optical imaging catheter or relay 102. The array 120 of two or more illumination beams, also referred to herein as array of multiple points of light, has a substantially one dimensional profile, such as the one illustrated in FIG. 3B. The confocal aperture array 140 preferably has a profile that matches that of array 120. Since array 120 is scanned along the dimension 120', the returning light from catheter or relay 102 will also move, along with the motion of array 120. Hence, confocal aperture array 140 is also scanned in synchronism with array 120 by means of a motor 154 (or other means), so that the aperture array is in a position to pass the returning light from catheter or relay 102, and block other stray light. Other techniques of creating aperture array motion, such as those described below in reference to FIGS. 5A-5D, may also be used.?

To build up a 2D image, a second synchronized scan mirror 156 is used to sweep the light returning through the confocal aperture array 140 across a 2D CCD detector 142, such as that of a CCD camera. Both scan mirrors 152 and 156 are locked to the frame rate of the camera so that each frame output from the camera produces a full 2D confocal image. An eyepiece 44 observed by eye 46 may be used instead of CCD detector 142. The interaction of the multiple points of light with the object may cause fluorescent light to return from the object, or the returning light from the object can be reflection or scattering of array 120 of illumination beams. Beam splitter 14 is dichroic only when the returning light from the object is fluorescent light.

Multi-spectral imaging is accomplished by diverting the beam through a prism 162. This is done by moving scan mirror 156 to a fixed angular offset position so that light returning from the sample goes through the prism. Light at different wavelengths is refracted at different angles, which map to different lateral positions on the CCD detector 142 in a CCD camera. For any given angular position of scan mirror 152, the light distribution on the CCD is a 2D distribution where one direction (parallel to the dimension 120') corresponds to a spatial coordinate, and the other direction (perpendicular to the dimension 120' and in the dispersion direction) corresponds to the spectral coordinate. As scan mirror 152 rotates, multiple frames are read out of the CCD to build a 3D multi-spectral data set with a full spectrum at each spatial location in the 2D image, using computer 172 processing the outputs of CCD detector 142. This requires slowing down the rotation of scan mirror 152.

FIG. 4A is a schematic view of a multi-point scanning system 200 employing a moving confocal aperture array that causes multi-point illumination and scanning to illustrate a third embodiment of the invention. FIG. 4B is a schematic view of the rotating star aperture array in FIG. 4A. The system 200 utilizes a fiber-coupled laser source 212 and anamorphic optics, consisting of a spherical lens 202, a cylindrical lens 204, and a beamsplitter 214, to couple excitation light into the system. The anamorphic optics combined with the spherical lens 206 to the right of the beamsplitter 214 produce a line of light at the confocal aperture plane. In the third embodiment, the confocal aperture consists of a slit 208 and a rotating star-pattern aperture array 240, whereas in a slit scanning system the confocal aperture is simply a slit. The star-pattern binary transmission aperture array 240 has a low duty cycle of open to opaque regions, effectively producing a set of multiple widely-spaced illumination points along the slit. As the star aperture array rotates, these points continuously move up the slit. The lens 224 shown to the right of the confocal aperture and the microscope objective 24 combine to image the aperture plane to the "object" plane of the confocal microscope. While using a cylindrical lens 204 makes efficient use of the light from the light source, it is not necessary where efficient use of the light is not a concern, and light from any source can simply be passed to the slit 208.

In a confocal microendoscope the proximal end of the flexible imaging catheter or relay 102 is placed at the "object" plane of the confocal microscope. The flexible fiber bundle in the imaging catheter relays this "object" plane to the distal end of the catheter, where a miniature objective lens images the "object" plane into the tissue at a selected depth. The depth of the imaging plane in tissue is controlled by a focus mechanism that moves the fiber relative to the miniature objective lens, which is held in contact with the tissue. The multiple points of light in the confocal aperture are imaged into the tissue and excite the fluorescence in the tissue. The fluorescent light returns through the system and is re-imaged onto the confocal aperture plane. As the star aperture array rotates, the points of illumination move along the slit direction. Where the light returning from the tissue is that of reflectance, reflected light is re-imaged onto the confocal aperture plane.

Integration of the light passing back through the aperture would represent a line image of the tissue at a selected depth and at a specific lateral position. To produce a 2D image, scanning perpendicular to the slit direction is required. Scanning of the illumination is accomplished by scan mirror 152. The fluorescent light returning from the tissue is de-scanned by this mirror to the fixed slit aperture location. To build up a 2D image, a second synchronized scan mirror 156 is used to sweep the image inside the slit across a CCD detector 142 of a CCD camera. Both scan mirrors are locked to the frame rate of the camera so that each frame output from the camera produces a full 2D confocal image. As in FIG. 3A, an eyepiece (not shown) may be used instead of CCD detector 142.

The dichroic beamsplitter 214 passes only the fluorescence from the sample and eliminates excitation light reflected from the tissue or scattered within the optical system. The beam path shown in the diagram is for the direction where the cylindrical lens has no optical power. In the perpendicular direction the cylindrical lens comes to focus at the front focal point of the lens to the left of the slit. Therefore the chief ray for every field point is parallel to the optical axis as it passes through the slit aperture. It is also parallel to the optical axis as it hits the fiber bundle. The interaction of the multiple points of light with the object may cause fluorescent light to return from the object as described above, or the returning light from the object can be reflection or scattering of the illumination beams, in which case beamsplitter 214 is not dichroic.

In FIG. 4A, the beam path shown is for the direction where the cylindrical lens has no optical power. Multi-spectral imaging is accomplished by diverting the beam through a prism 162. This is done by moving scan mirror 156 to a fixed angular offset position so that light returning from the sample and passed by the slit goes through the prism. Light at different wavelengths is refracted at different angles, which map to different lateral positions on the CCD camera. For any given angular position of scan mirror 152, the light distribution on the CCD is a 2D distribution where one direction (parallel to the slit 208) corresponds to a spatial coordinate, and the other direction (perpendicular to the slit and in the dispersion direction) corresponds to the spectral coordinate. As scan mirror 152 rotates, multiple frames are read out of the CCD 142 to build a 3D multi-spectral data set with a full spectrum at each location in the 2D image, using computer 172 processing the outputs of CCD detector 142. This requires slowing down the rotation of scan mirror 152. For 128 data points per spectrum, the frame rate is 30/128 or approximately 4 seconds per complete data set. The scan mirrors can be under computer control so that one can switch rapidly (<30 ms) between the mode where there is no dispersion by prism 162 of the light returning from the object and the multi-spectral mode of operation where there is such dispersion.

The scan paths in the embodiments of FIGS. 3A and 4A are illustrated in FIG. 1E. As shown in FIG. 1E, the scan path is similar to that of FIG. 1D, except that it is slanted upwards as the scanning proceeds.

The multi-spectral capability described above is unique to this new approach and would not be easy to implement using a Nipkow disk. Moreover, the cylindrical lens makes the new approach more light efficient, which is important for a system utilizing a fiber bundle, which has significant transmission losses.

While preferably systems 10, 100 and 200 are confocal, they can also be used in a non-confocal configuration, where no aperture array is needed. This configuration is not confocal and has no depth discrimination, but would work for imaging a planar surface.

FIGS. 5A, 5B, 5C and 5D are schematic views of four different arrangements for creating multi-point illumination that may be used for the systems in FIGS. 3A and 4A.

The light source 112 of FIG. 3A may be implemented as shown in FIG. 5A, in which light source 112 includes a laser or lamp (not shown), a slit 302 aligned along the first dimension 120', and an array 304 of radial slits on a disk 300. Slit 302 and array 304 overlap and pass light from the laser or lamp illustrated as dark areas in FIG. 5A. Array 304 is rotated by a motor or other means (not shown) along arrow 306, so that the light passing through slit 302 is modulated in that different portions 310 of the light along dimension 120' are passed through slit 302 and some of the radial slits 304 at different times, so that not only does this generate an array of light beams for illuminating an object, but also causes the array of light beams to scan the object along dimension 120'. In order that the confocal aperture array 140 of FIG. 3A will pass the returning light from the object after interaction of the object with the beams, preferably the confocal aperture array 140 has a profile that matches the profile of the array of beams 310, and moves in synchronism with beams 310, such as by means of a mechanism similar in construction to the apparatus of FIG. 5A, 5B, 5C or 5D described herein. In the embodiment of FIG. 4A, the matching is done automatically by the star aperture array 240, since the same star aperture array 240 generates the scanning array of illumination beams and also transmits the returned light from tissue.

The light source 112 of FIG. 3A may be implemented as shown in FIG. 5B, in which light source 112 includes a laser or lamp (not shown) that provides a light beam. This beam can be one similar to the beam generated by means of spherical and cylindrical lenses 202 and 204 of FIG. 4, with the length of the beam cross-section along dimension 120'. Light source 112 of FIG. 3A may also include a disk 320 with pin holes along its perimeter where some of the pin holes overlap the light beam, so that portions 324 of the beam passing through the overlapping pin holes (shown as dark spots in FIG. 5B) are passed in the forward direction for illumination.

Disk 320 is rotated by a motor or other means (not shown) along arrow 326, so that the light passing through pin holes 322 is modulated in that different portions of the light along dimension 120' passes through the pinholes 322 at different times in a substantially one dimensional array of beams, so that not only does this generate an array of light beams for illuminating an object, but also causes the array of light beams 324 to scan the object along dimension 120'. In order that the confocal aperture array 140 will pass the returning light from the object after interaction of the object with the beams, preferably the confocal aperture array 140 has a profile that matches the slightly curved profile of the array of beams 324, and moves in synchronism with beams 324, such as by means of a mechanism similar in construction to the apparatus of FIG. 5A, 5B, 5C or 5D described herein.

As shown in FIG. 5C, light source 112 of FIG. 3A may include a laser or lamp (not shown), an elongated plate 350 with its length along dimension 120'. The plate 350 has pin holes along its length aligned along the first dimension 120' that passes light from the laser or lamp shown as dark areas 352 in FIG. 5C. The light source 112 of FIG. 3A may also include a mechanism (not shown) for moving plate 350 in linear motion or oscillating motion along arrow 354 parallel to dimension 120'.

Thus light passing through pin holes in plate 350 generates an array of light beams 352 for illuminating an object, and the linear motion of plate 350 causes the array of light beams to scan the object along dimension 120'. In order that the confocal aperture array 140 of FIG. 3A will pass the returning light from the object after interaction of the object with the beams, preferably the confocal aperture array 140 has a profile that matches the profile of the array of beams 352, and moves in synchronism with beams 352, such as by means of a mechanism similar in construction to the apparatus of FIG. 5A, 5B, 5C or 5D described below.

As shown in FIG. 5D, light source 112 of FIG. 3A may include a laser or lamp (not shown) and a linear array 380 of electronically controlled individually addressable apertures 382 (e.g. liquid crystal pixels) aligned along dimension 120'. A control device (not shown) may be used to cause, such as by electro-optic mechanisms, different ones of the individually addressable apertures to pass light from the laser or lamp at different times, similar to the scanning achieved by the schemes in FIGS. 5A-5C. As shown conceptually in FIG. 5D, only every other aperture 384 along dimension 120' is rendered light transmissive, with the remaining apertures remaining opaque to light, so that an array of light beams 384 is transmitted through selected apertures for illumination. In actual implementations, it may be only one aperture for a larger number of apertures that is rendered transmissive, with the remaining apertures remaining opaque to light.

Thus this manner of generating the light beams 384 not only generates the beams, but also causes the array of light beams 384 to scan the object along dimension 120'. In order that the confocal aperture array 140 of FIG. 3A will pass the returning light from the object after interaction of the object with the beams, preferably the confocal aperture array 140 has a profile that matches the profile of the array of beams 384, and moves in synchronism with beams 384, such as by means of a mechanism similar in construction to the apparatus of FIG. 5A, 5B, 5C or 5D described herein.

As described above, all of the arrays of illumination beams 310, 324, 352 and 384 are substantially one dimensional along dimension 120'. The embodiment of FIGS. 4A and 4B employs the scheme of FIG. 5A. However, the scheme of FIG. 5B, 5C or 5D may be used instead and is within the scope of the invention.

Figure 6A:
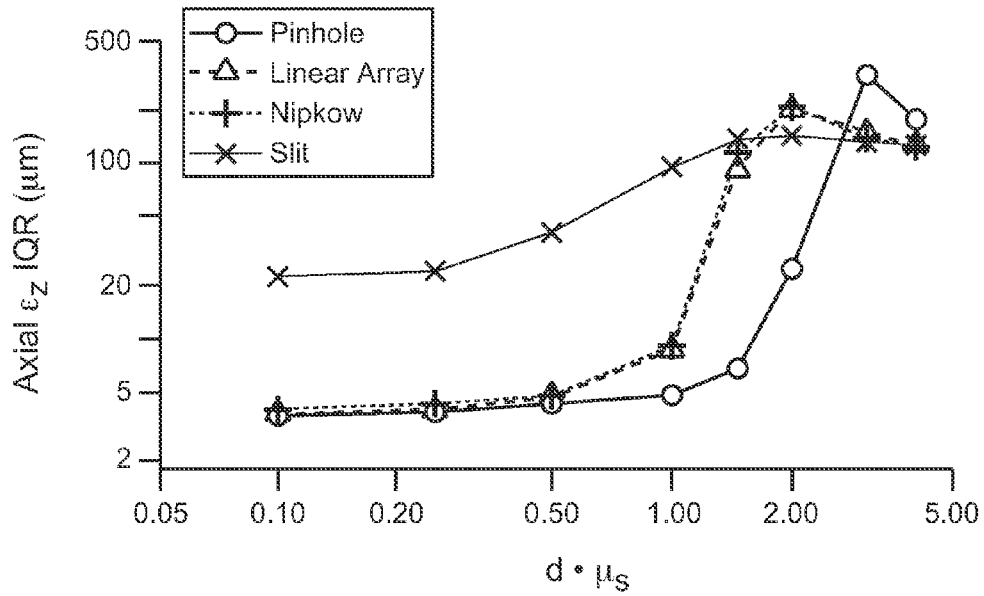
FIG. 6A, 6B are graphical plots of the lateral and axial interquartile range performance in μm as a function of imaging depth for each of four types of apertures.
Figure 6B:
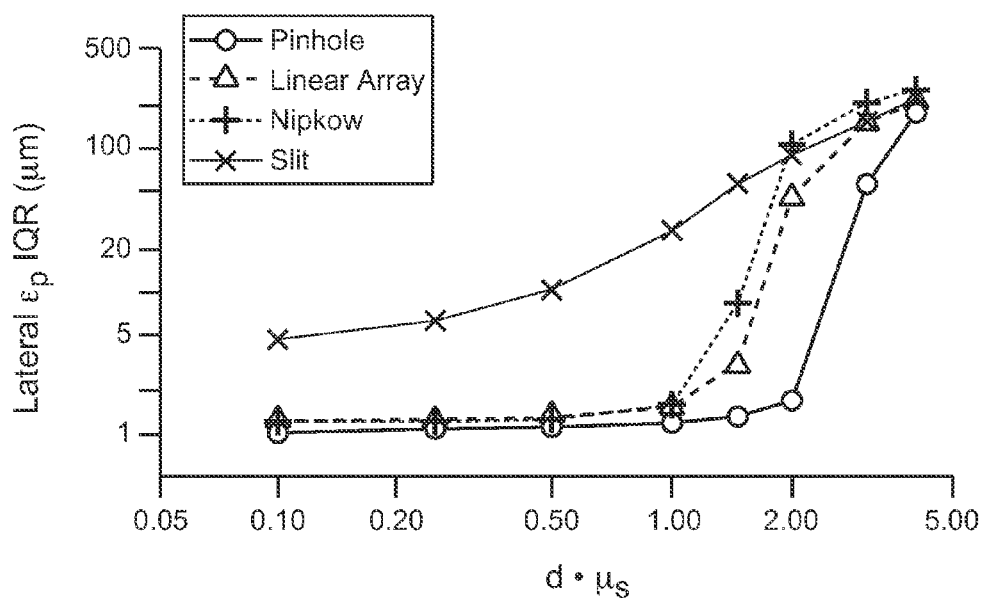

FIGS. 6A, 6B are graphical plots of the lateral and axial interquartile range (IQR) performance in $\mu m$ as a function of imaging depth for each of four types of apertures.

FIGS. 6A, 6B show how the pinhole aperture has an axial performance of about 1 micrometer and lateral performance of about 4 micrometers down to $d \cdot \mu_s = 1$. The linear array and Nipkow aperture maintain performance comparable to the pinhole aperture down to a depth greater than $d \cdot \mu_s = 0.5$. The slit aperture has substantially worse performance. Its lateral performance is about 5 $\mu m$ and the axial performance is about five times worse than the other three apertures.

To maximize the scanning speed performance and light efficiency of the linear array, the highest possible aperture density should be used. To determine the maximum possible density that can be used, the maximum imaging depth $d \cdot \mu_s$ is specified a priori. Since the axial and lateral performance monotonically degrades as the imaging depth is increased (except very close to the surface), the center to center pinhole spacing need only be optimized to obtained the minimum acceptable performance at the maximum imaging depth.

While the invention has been described above by reference to various embodiments, it will be understood that changes and modifications may be made without departing from the scope of the invention, which is to be defined only by the appended claims and their equivalents.

It is claimed:

1. A confocal microscope comprising:
   a light source providing a first illumination beam travelling in a forward direction;
   a device that modulates the first illumination beam to provide a substantially one dimensional array of two or more illumination beams spread along a first dimension;
   optics that focus said array of two or more illumination beams to an object plane in an object;
   a first mechanism to scan light from said first illumination beam along a second dimension transverse to the first dimension before light from said first illumination beam reaches the object plane, wherein said first mechanism or said device causes light from said first illumination beam to scan along the first dimension, so that said array of two or more illumination beams scans across the object plane along said first and second dimensions; and
   a confocal aperture array transmitting light caused by interaction of the array of two or more illumination beams and the object in the reverse direction in a manner so that the transmitted light caused by the interaction matches a profile of the said array of two or more illumination beams.

2. The microscope of claim 1, wherein said device provides the array of two or more illumination beams by movement along the first dimension, and said confocal aperture array is moved in the direction of said first dimension to match the movement caused by the device.

3. The microscope of claim 2 wherein a second mechanism scans along said second dimension the light transmitted in said reverse direction through said confocal aperture array.

4. The microscope of claim 2, further comprising at least one eyepiece for observation of the light transmitted in said reverse direction through said confocal aperture array.

5. The microscope of claim 2, further comprising a two dimensional array of detectors for detection of the light transmitted in the reverse direction through the confocal aperture array.

6. The microscope of claim 5, further comprising an element that disperses said group of beams by wavelength.

7. The microscope of claim 6, said element comprising a prism or grating.

8. The microscope of claim 6, wherein said array of detectors provides outputs in response to the light transmitted in said reverse direction through the confocal aperture array, said microscope further comprising a computer that produces a three dimensional multi-spectral data set from the outputs of said array of detectors.

9. The microscope of claim 1, wherein the interaction of said array of two or more illumination beams with the object causes light to be generated by fluorescence, said microscope further comprising a dichroic beam splitter separating light of said first illumination beam from light transmitted in said reverse direction through the confocal aperture array.

10. The microscope of claim 1, wherein the interaction of said first illumination beam with the object causes light to be reflected or backscattered by the object, said microscope further comprising a beam splitter separating light of said first illumination beam from the light transmitted in said reverse direction through the confocal aperture array.

11. The microscope of claim 1, said device comprising a slit aperture aligned with the first dimension and an array of apertures, wherein said array of two or more illumination beams is created by rotation of the array of apertures so that the apertures in the array of apertures overlap different parts of the slit aperture along a length of the slit aperture at different times to pass different parts of said first illumination beam at said different times in the forward direction.

12. The microscope of claim 1, said device comprising an array of apertures aligned with said first dimension, wherein said array of two or more illumination beams is created by moving said array of apertures relative to said first illumination beam by rotational motion or translational motion, so that the apertures in the array of apertures pass different parts of said first illumination beam at different times in the forward direction.

13. The microscope of claim 1, said device comprising an array of electronically controlled individually addressable apertures.

14. The microscope of claim 3, wherein said second mechanism comprises a mirror and a motor for rotating the mirror.

15. The microscope of claim 1, further comprising a flexible or rigid optical relay.

16. The microscope of claim 1, further comprising a fiber bundle to accomplish optical relay.

17. A method for scanning an object, comprising:
   providing a substantially one dimensional array of two or more illumination beams spread along a first dimension travelling in a forward direction;
   focusing said array of two or more illumination beams to an object plane in the object;
   scanning light from said array of two or more illumination beams along a second dimension transverse to the first dimension before light from the two or more illumination beams reaches the object plane, wherein said providing or said scanning also causes light from the two or more illumination beams to scan along the first dimension, so that said array of two or more illumination beams scans across the object plane along said first and second dimensions; and
   transmitting through an aperture array light caused by interaction of the array of two or more illumination beams and the object in the reverse direction in a manner so that the transmitted light caused by the interaction matches a profile of the said array of two or more illumination beams.

18. The method of claim 17, further comprising dispersing the light transmitted through the aperture array in a reverse direction onto an array of detectors.

19. The method of claim 18, wherein said array of detectors provides outputs in response to the light returning in said reverse direction, said method further comprising constructing a three dimensional multi-spectral data set from the outputs of said array of detectors.

20. A confocal microscope comprising:
   a light source providing a first illumination beam travelling in a forward direction to an object;
   a confocal aperture array passing portions of the first illumination beam to form a substantially one dimensional array of two or more illumination beams spread along a first dimension travelling in the forward direction and transmitting light caused by interaction of the array of two or more illumination beams and the object in a reverse direction;

a device causing said confocal aperture array to pass different portions of the first illumination beam at different times to form the array of two or more illumination beams in the forward direction, thereby causing the array of two or more illumination beams to scan the object along the first dimension;

optics that focus said array of two or more illumination beams to an object plane;

a mechanism to scan the array of two or more illumination beams along a second dimension transverse to the first dimension, so that said array of two or more illumination beams scans across the object plane along said first and second dimensions.

* * * * *